(12) United States Patent
Lorentz et al.

(10) Patent No.: US 6,372,697 B1
(45) Date of Patent: Apr. 16, 2002

(54) USE IN A COLD DRAWING LUBRICANT, OF A COBALT AND/OR NICKEL SALT SUSPENSION AS ADHESIVE, LUBRICATING, SUSPENDING AGENT AND METHOD FOR OBTAINING SAME

(75) Inventors: Gilles Lorentz, Courbevoie; Hélène Lannibois-Drean, Charenton le Pont, both of (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/446,531
(22) PCT Filed: Apr. 27, 1999
(86) PCT No.: PCT/FR99/00996
  § 371 Date: Jun. 28, 2000
  § 102(e) Date: Jun. 28, 2000
(87) PCT Pub. No.: WO99/55809
  PCT Pub. Date: Nov. 4, 1999

(30) Foreign Application Priority Data

Apr. 28, 1998 (FR) .............................................. 98/05315

(51) Int. Cl.⁷ ............................................ C10M 173/02
(52) U.S. Cl. ........................ 508/198; 508/380; 508/539
(58) Field of Search ................................. 508/198, 380, 508/539

(56) References Cited

U.S. PATENT DOCUMENTS

| 1,919,718 A | | 7/1933 | Gray | |
|---|---|---|---|---|
| 3,897,583 A | * | 7/1975 | Bellamy | 428/256 |
| 4,239,663 A | * | 12/1980 | Ravagnani et al. | 525/370 |
| 4,370,244 A | * | 1/1983 | Weinhold et al. | 72/42 |
| 4,719,266 A | * | 1/1988 | Craig | 428/465 |
| 5,208,074 A | | 5/1993 | Kosal | |
| 5,389,163 A | | 2/1995 | Hachisuka | |
| 5,722,039 A | * | 2/1998 | Orjela | 428/610 |
| 6,059,951 A | * | 5/2000 | Orjela | 205/141 |

FOREIGN PATENT DOCUMENTS

| DE | 21 08 210 | 2/1971 |
|---|---|---|
| EP | 0 137 986 | 8/1984 |
| EP | 0 383 150 | 2/1990 |
| GB | 887 606 | 7/1959 |
| GB | 2 087 914 | 10/1981 |
| GB | 2 076 320 | 12/1981 |

* cited by examiner

*Primary Examiner*—Jacqueline V. Howard
(74) *Attorney, Agent, or Firm*—Burns, Doane, Swecker & Mathis, L.L.P.

(57) ABSTRACT

This invention concerns the use, in a cold drawing lubricating solution, as adhesive and lubricating agent, for a steel wire trimmed with brass and rubber, of an aqueous suspension comprising at least a cobalt and/or nickel salt compound of a saturated or unsaturated carboxylic acid (i), or a phosphate ester (ii), or a cobalt and/or nickel boroacylate (iii); and at least a non-ionic or anionic surfactant; the compound (i), (ii), and/or (iii)/surfactant weight ratio ranging between 0.5 and 10. The invention also concerns said suspension and preparation methods thereof. The invention further concerns a cold drawing lubricating solution comprising said suspension.

28 Claims, No Drawings

USE IN A COLD DRAWING LUBRICANT, OF A COBALT AND/OR NICKEL SALT SUSPENSION AS ADHESIVE, LUBRICATING, SUSPENDING AGENT AND METHOD FOR OBTAINING SAME

This application is a 371 of PCT/FR99/00996 Apr. 27, 1999.

The present invention relates to the use, as an additive allowing the adhesion of a brass-plated steel wire and rubber, of an aqueous suspension comprising at least one compound such as a cobalt and/or nickel salt of a saturated or unsaturated carboxylic acid (i) or of a phosphate ester (ii) or of a cobalt and/or nickel boracylate; and at least one surfactant, in a drawing lubricant.

The invention similarly relates to the use, as a drawing lubricant additive for a brass-plated steel wire, of such an aqueous suspension.

In addition, the invention relates to an aqueous suspension comprising at least one compound such as a cobalt and/or nickel salt of a saturated or unsaturated acid (i), of a phosphate ester (ii) or of a cobalt and/or nickel boracylate; and at least one nonionic or anionic surfactant; the weight ratio of compound (i), (ii) and/or (iii) to the surfactant being between 0.5 and 10; as well as to processes for obtaining it.

The field of the present invention thus essentially forms part of the tyre industry and in particular the preparation of tyres. More particularly, the present invention relates to improving the adhesion of rubber and of the metal cord used to reinforce tyres. This metal cord consists of several wires of small diameter, cabled together and then woven so as to form a mesh which is then incorporated into the rubber.

Generally, the cabled wire is based on steel coated with brass, so as to facilitate the adhesion between the cord and the polymer matrix, This happens because the copper in the brass reacts with the sulphur which is used as the rubber vulcanizing agent. In addition, the ductile nature of brass facilitates deformation of the brass-plated steel in the drawing die.

This solution is very satisfactory, at least as regards the initial adhesion, However, a degradation of the properties of tyres thus equipped, over time, has been observed, due in particular to a migration of the zinc under the effect of the external conditions (humidity, presence of sodium chloride). Effectively, zinc diffuses into the rubber and creates zones rich in zinc oxide. This zinc oxide-then becomes converted into zinc hydroxide which is fragile, as a consequence of which it degrades the mechanical properties of the tyre.

It has been considered to replace brass with a more complex, bilayer alloy obtained, before drawing, by electroplating. This alloy comprises a first layer based on zinc and 1% cobalt; the second based on nickel and 20% zinc. The major drawback of this method is that it replaces the layer of brass, which has many advantages during the drawing operation. In fact, the operation for drawing the cord coated with this bilayer system is made very complex. Specifically, whereas the drawing of brass-plated steel wires conventionally takes place at a rate of about 1000 m/minute, with the dies being worn out every 2000 km, steel wires coated with the bilayer system can only be drawn at rates of about 700 m/min and the dies wear out every 0.2 to 100 km (G. Orjeia, S. J. Harris, M. Vincent, F. Tommasini; Summary Report on Brite-Euram Project BREU-0424, KGK Kautschuk Gummmi Kunststoffe 50 -Jahrgang, No. 11/97; 778–785). Finally, the operation for drawing wires coated with the bilayer system is not industrial.

The subject of the present invention is to propose another route for treating brass-plated steel wires, with the aim of improving the adhesion between the cords and rubber during the preparation of tyres.

These aims and others are achieved by the present invention, a subject of which is thus the use, as an adhesive for a brass-plated steel wire and rubber, of an aqueous suspension comprising at least one compound such as a cobalt and/or nickel salt of a saturated or unsaturated carboxylic acid (i) or of a phosphate ester (ii) or of a cobalt and/or nickel boroacylate; and at least one nonionic or anionic surfactant; the weight ratio of compound (i), (ii) and/or (iii) to the surfactant being between 0.5 and 10.

The process according to the invention is particularly simple since the said suspension is added to the lubricant solution used during the wire-drawing operation.

In addition, the advantage provided by brass during the drawing operation is retained. Thus, the conventional and industrial drawing conditions can still be applied.

Finally, the process according to the invention is highly efficient since, after the drawing operation, it is found that the wire has cobalt or nickel at its surface. The consequence of this is to improve the resistance of the adhesion to ageing of the mesh comprising the woven cords.

It should be noted that the addition of the cobalt or nickel compound to the lubricant solution used during the drawing could not come about in an obvious manner.

Specifically, the lubricant solutions conventionally used during drawing are based on cobalt-and nickel-complexing agents. Thus, it is observed that a suspension of a cobalt or nickel compound gives, within a few minutes, after it has been placed in contact with the lubricant solution, a precipitate which separates out by settling, and which makes the resulting suspension unusable since its constituent lubricant bases have been depleted.

On the other hand, it has been found, surprisingly, that the suspension according to the present invention, when added to a lubricant solution comprising cobalt- or nickel-complexing agents, does not result in the appearance of such a precipitate. In addition, in particular in the case of cobalt and/or nickel salts, the resulting suspension is in the form of a slightly opalescent suspension, which has no flocs visible to the naked eye, is stable and does not separate out by settling.

It has similarly been found, entirely unexpectedly, and this constitutes, as indicated previously, another subject of the invention, that an aqueous suspension comprising at least one cobalt and/or nickel compound as defined above and at least one nonionic or anionic surfactant, the weight ratio of the compound to the surfactant being between 0.5 and 10, had a lubricant action during the drawing operation. Specifically, it has been found that the consumption of drawing dies was lower when the suspension according to the invention was present in the drawing lubricant.

However, other advantages and characteristics of the present invention will emerge more clearly on reading the description and the example which follow.

For reasons of simplification of the description of the invention, the suspension will first be described, along with its production.

As has been mentioned previously, the suspension used in the invention is based on a cobalt and/or nickel compound.

It should be noted that, in the text hereinbelow, the compounds based on cobalt or nickel will be referred to cobalt/nickel, it being understood that this name applies to either of the metals, as well as to their combination.

In one particularly advantageous embodiment of the invention, the metal used is cobalt.

According to a first variant (i) of the invention, the aqueous suspension is based on at least one cobalt/nickel compound which is a carboxylic acid salt.

According to one specific embodiment of the invention, the cobalt/nickel salt of carboxylic acid is insoluble in aqueous media.

More particularly, the salt is derived from a saturated or unsaturated carboxylic acid comprising 5 to 40 carbon atoms.

Preferably, the acid corresponds to the 5 following formula:

$$R^1\text{—COOH}$$

in which formula $R^1$ represents a linear or branched alkyl or alkenyl radical with one or more ethylenic unsaturations, containing from 5 to 40 carbon atoms (the carbon atom of the carboxylic group being included), optionally substituted with one or more hydroxyl radicals and/or a carboxylic function.

According to one advantageous embodiment of the invention, the suspension comprises a salt of an acid corresponding to the abovementioned formula, in which $R^1$ represents an alkyl radical comprising 7 to 30 carbon atoms, optionally substituted with one or more hydroxyl radicals and/or a carboxylic function.

It should be noted that the second carboxylic function, if it is present, may or may not be at the end of the chain.

Preferably, a fatty acid is used, more particularly comprising only one carboxylic function.

Examples of saturated fatty acids which may be mentioned are stearic acid, palmitic acid and behenic acid.

Examples of unsaturated fatty acids which may be mentioned are unsaturated fatty acids with only one double bond, such as linderic acid, myristoleic acid, palmitoleic acid, oleic acid, petroselenic acid, doeglic acid, gadoleic acid, erucic acid; unsaturated fatty acids with two double bonds, such as linoleic acid; unsaturated fatty acids with 3 double bonds, such as linolenic acid; unsaturated fatty acids with more than 4 double bonds, such as isanic acid, stearodonic acid, arachidonic acid and chypanodonic acid; unsaturated fatty acids bearing a hydroxyl group, such as ricinoleic acid, and mixtures thereof.

Among the abovementioned acids, palmitic acid, behenic acid, stearic acid, palmitoleic acid, oleic acid, petroselenic acid, erucic acid, linoleic acid, linolenic acid and ricinoleic acid are preferably used.

It should be noted that it would not constitute a departure from the context of the present invention to use one or more acids.

The molar ratio of the acid used relative to the cobalt/nickel, expressed as metal, is at least 1/1. More particularly, the said molar ratio ranges between 2/1 and 10/1.

In addition, the suspension comprises at least one nonionic or anionic surfactant.

Among the nonionic surfactants that are suitable, mention may be made, inter alia, of:
  polyoxyalkylenated alkylphenols in which the alkyl substituent is $C_6$–$C_{12}$;
  polyoxyalkylenated mono-, di- or tri(alkylaryl)phenols in which the alkyl substituent is $C_1$–$C_6$;
  polyoxyalkylenated $C_8$–$C_{22}$ aliphatic alcohols;
  polyoxyalkylenated triglycerides;
  polyoxyalkylenated fatty acids;
  polyoxyalkylenated sorbitan esters;
  polyoxyalkylenated fatty amines;
  optionally polyoxyalkylenated $C_8$–$C_{20}$ fatty acid amides;
  glucosamides, glucamides;
  alkylpolyglycosides (U.S. Pat. No. 4,565,647);
  glycerolamides derived from N-alkylamines (U.S. Pat. No. 5,223,179 and FR 1 585 966);
  the products resulting from the condensation of ethylene oxide with a hydrophobic compound resulting from the condensation of propylene oxide with propylene glycol (Pluronic®);
  the products resulting from the condensation of ethylene oxide with a compound resulting from the condensation of propylene oxide with ethylenediamine (Tetronic®);
  the products resulting from the condensation of ethylene oxide with a hydrophobic compound resulting from the condensation of propylene oxide with an alcohol of terpenic origin (Rhodoclean®; FR 2 721 921);
  amine oxides, such as ($C_{10}$–$C_{18}$) alkyldimethylamine oxides and ($C_8$–$C_{22}$) alkoxyethyldihydroxyethylamine oxides.

The number of polyoxyalkylene units, if they are present, in these nonionic surfactants usually ranges from 2 to 100 depending on the desired HLB (hydrophilic/lipophilic balance). Preferably, this number is between 2 and 50. It should be noted that the expression "polyoxyalkylene units" is intended to cover oxyethylene and oxypropylene units, or mixtures thereof.

Among the polyoxyalkylenated (oxyethylenated, oxyethylenated/oxypropylenated) alkylphenols which are suitable, mention may be made of those which are linear or branched, with one or two alkyl groups, containing 4 to 12 carbon atoms, in particular octyl, nonyl or dodecyl. They more particularly contain 3 to 25 oxyethylene or oxyethylene and oxypropylene units. By way of example, mention may be made of the products Triton® X-45, X-114, X-100 or X-102 and Igepal® NP14.

As regards the polyalkylenated $C_8$–$C_{22}$ aliphatic alcohols, it may be preferable to use alcohols with 1 to 25 polyoxyalkylene (oxyethylene, oxyethylene/oxypropylene) units. By way of example, mention may be made of the products Rhodasurf® CET 5 and CET 2; Tergitol® 15-S-9, 24-L-6 NMW, Neodol® 45-9, 23-65, 45-7, 45-4, Kyro Eob®; Plantaren®.

The polyoxyalkylenated (oxyethylenated, oxyethylenated/oxypropylenated) triglycerides can be triglycerides of plant or animal origin (such as lard, tallow, ground nut oil, butter oil, cottonseed oil, flax oil, olive oil, palm oil, grapeseed oil, fish oil, soybean oil, castor oil, rapeseed oil, copra oil or coconut oil). They are preferably polyoxyethylenated. For the purposes of the present invention, the expression "polyoxyalkylenated triglyceride" means both the products obtained by alkoxylation of a triglyceride with ethylene oxide (optionally with propylene oxide) and those obtained by transesterification of a triglyceride with a polyethylene glycol (optionally with polypropylene glycol).

The polyoxyalkylenated (oxyethylenated, oxyethylenated/oxypropylenated) fatty acids are esters of fatty acids (such as, for example, oleic acid or stearic acid) and are preferably ethoxylated. It should similarly be noted that the expression "polyoxyalkylenated fatty acid" includes both the products obtained by alkoxylation of a fatty acid with ethylene oxide (optionally with propylene oxide) and those obtained by esterification of a fatty acid with a polyethylene glycol (optionally with polypropylene glycol).

The polyoxyalkylenated (oxyethylenated, oxyethylenated/oxypropylenated) sorbitan esters are esters of cyclized sorbitol and of $C_{10}$ to $C_{20}$ fatty acids such as lauric acid, stearic acid or oleic acid, and are preferably ethoxylated.

The polyoxyalkylenated (oxyethylenated, oxyethylenated/oxypropylenated) fatty amines generally contain from 10 to 22 carbon atoms and are preferably ethoxylated.

Among the anionic surfactants that are suitable, mention may be made, by way of example, of:

alkyl ester sulphonates of formula R—CH($SO_3$M)—COOR', in which R represents a $C_8$–$C_{20}$, preferably $C_{10}$–$C_{16}$, alkyl radical, R' represents a $C_1$–$C_6$, preferably $C_1$–$C_3$, alkyl radical and M represents an alkali metal (sodium, potassium or lithium) cation, ammonium —N($R_3$)$^+$with R, which may be identical or different, representing a hydrogen atom, a hydrocarbon-based radical comprising 1 to 4 carbon atoms, optionally bearing a hydroxyl radical;

alkyl sulphates or alkyl aryl sulphates of formula $ROSO_3$M, in which R represents a $C_{10}$–$C_{24}$ alkyl or hydroxyalkyl radical, M representing a hydrogen atom or a cation of the same definition as above.

It is similarly possible to use the ethoxylated (EO) and/or propoxylated (PO) derivatives of these surfactants. The average number of units (EO and/or PO) is, in this case, between 0.5 and 6, preferably from 0.5 to 3 units;

sulphated polyoxyalkylenated fatty alcohols; sulphated polyoxyalkylenated di(1-phenylethyl)phenols; sulphated polyoxyalkylenated tri(1-phenylethyl)phenols; sulphated polyoxyalkylenated alkylphenols;

alkylamide sulphates of formula RCONHR'O$SO_3$M in which R represents a $C_2$–$C_{22}$ alkyl radical, R' represents a $C_2$–$C_3$ alkyl radical, M representing a hydrogen atom or a cation of the same definition as above, as well as the ethoxylated (EO) and/or propoxylated (PO) derivatives thereof, with on average from 0.5 to 60 EO and/or PO units;

salts of saturated or unsaturated $C_8$–$C_{24}$, preferably $C_{14}$–$C_{20}$, fatty acids, $C_9$–$C_{20}$ alkylbenzenesulphonates, primary or secondary $C_8$–$C_{22}$ alkyl sulphonates, alkylglycerol sulphonates, sulphonated polycarboxylic acids described in GB-A-1 082 179, and paraffin sulphonates;

polyoxyalkylenated fatty alkyl mono- or diester phosphates, polyoxyalkylenated di(1-phenylethyl) phenyl mono- or diester phosphates, polyoxyalkylenated tri(1-phenylethyl)phenyl mono- or diester phosphates, polyoxyalkylenated alkylphenyl mono- or diester phosphates;

N-acyl N-alkyltaurates, alkyl isethionates, alkyl succinamates, alkyl sulphosuccinates, sulphosuccinate monoesters or diesters, N-acyl sarcosinates, alkyl glycoside sulphates, polyethoxycarboxylates, the cation being an alkali metal (sodium, potassium or lithium), an ammonium —N($R_3$)$^+$with R, which may be identical or different, representing a hydrogen atom, a hydrocarbon-based radical comprising 1 to 4 carbon atoms, optionally bearing a hydroxyl radical.

It should be noted that the nonionic and anionic surfactants described above can be used alone or as mixtures.

According to another characteristic of the invention, the weight ratio of the cobalt/nickel compound (salt) to the surfactant is between 0.5 and 10, preferably between 1 and 5.

According to a second variant of the invention (ii), the suspension comprises at least one cobalt/nickel compound which is a phosphate ester salt.

More specifically, the salt is derived from a phosphate ester of the following formula:

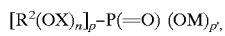

$R^2$ is a saturated or unsaturated, aliphatic, cycloaliphatic or aromatic hydrocarbon-based radical containing 1 to 30 carbon atoms, X is a linear or branched alkylene radical comprising 2 to 4 carbon atoms, M is a hydrogen atom, an alkali metal (sodium or potassium preferably) or an ammonium radical of formula —N($R_3$)$^+$, in which R, which may be identical or different, represent a hydrogen atom, a $C_1$–$C_4$ alkyl radical, optionally comprising an oxygen atom, n is a value ranging from 0 to 100, p and p' are equal to 1 or 2, with the condition that p+p'=3.

Everything which has been stated previously with regard to the nature of the nonionic and anionic surfactants, as well as the respective proportions, remains valid and will not be repeated here. More particularly, the molar ratio of the phosphate ester used relative to the cobalt/nickel, expressed as metal, is at least 1/1.

According to a third variant of the invention (iii), the suspension comprises at least one compound which is a boroacylate of a cobalt/nickel compound.

More particularly, the boroacylate has the following formula:

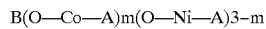

in which formula:

A, which may be identical or different, represent a saturated or unsaturated monocarboxylic acid residue comprising 5 to 24 carbon atoms; a resinic acid residue; an aromatic acid residue comprising 7 to 11 carbon atoms; a naphthenic acid residue, m is an integer or non-integer between 0 and 3.

More particularly, examples of saturated carboxylic acids which may be mentioned are pentanoic acid, 2,2-dimethylpentanoic acid, 4,4-dimethylpentanoic acid, 2-ethylpentanoic acid, 2,4,4-trimethylpentanoic acid, n-octanoic acid, 2,2-dimethylhexanoic acid, 2,2-dimethylheptanoic acid, 2,5,5-trimethylhexanoic acid, n-decanoic acid, 2,2,2-trialkylacetic acid mixtures, known under the names neodecanoic acids or versatic acids. Similarly, palmitic acid, behenic acid, stearic acid, palmitoleic acid, oleic acid, petroselenic acid, erucic acid, linoleic acid, linolenic acid and ricinoleic acid may be suitable.

As regards the resinic acids, these acids are derived from wood resins, for example such as abietic acid.

Aromatic acids such as benzoic acid may be suitable, as well as derivatives thereof substituted with alkyl, alkoxy, amino or halo radicals, such as salicylic acid, chlorobenzoic acid, phthalic acid, terephthalic acid, cinnamic acid, etc.

These compounds are well known and are sold in particular under the brand name Manobond® (Rhodia Ltd).

A first method for preparing the suspension used according to the invention consists in placing a water-soluble derivative of a carboxylic acid (i) or of a phosphate ester (ii) in contact, in aqueous medium, with a cobalt and/or nickel salt, in the presence of at least one nonionic or anionic surfactant.

The cobalt and nickel are used more particularly in the form of at least one water-soluble salt. Suitable salts which may be mentioned, for example, are halides, such as chlorides, as well as salts of organic acids, such as formate and acetate, inter alia. Preferably, organic acid salts such as acetate are used.

As regards the water-soluble carboxylic acid derivative, an alkali metal salt is more particularly used, and more particularly a sodium salt, the carboxylic acid having been defined previously.

It should be noted that the process according to the invention can advantageously be carried out using the abovementioned water-soluble salt, directly or else by using a precursor of such a compound, for example the acid or an ester of this acid, or alternatively an anhydride (when the acid used comprises two carboxylic functions).

When an ester is used, an ester derived from a saturated or unsaturated alcohol comprising 1 to 6 carbon atoms is preferably used.

If a precursor is used, it is preferable to convert this precursor into a water-soluble salt firstly, and more particularly before placing it in contact with the cobalt or nickel salt and the surfactant.

When a water-soluble phosphate ester derivative is used, this derivative can be chosen from the phosphate esters defined previously. Preferably, a sodium salt of a phosphate ester is used.

The process for preparing the suspension, according to this first method, consists more particularly in carrying out the following steps:

1) a first aqueous solution of a water- soluble carboxylic acid derivative (i) or of a phosphate ester derivative (ii) is prepared, and is placed in contact with at least one surfactant, preferably a nonionic surfactant;
2) a second aqueous solution comprising at least one cobalt and/or nickel salt is prepared;
3) the two solutions obtained are mixed together.

Preferably, this mixing operation takes place by introducing the cobalt and/or nickel salt solution into the solution comprising the water-soluble salt of a phosphate acid or ester.

The placing in contact can be carried out with or without stirring.

Moreover, the amounts of the compounds used are such that the various ratios, such as the phosphate acid or ester/metal (cobalt/nickel) molar ratio and the metal compound (cobalt/nickel)/surfactant weight ratio remain within the specified ranges.

Another method for preparing the suspension according to the invention consists in using a hot emulsion, This embodiment can be carried out to obtain each of the compounds (i) to (iii).

More particularly, the following steps are carried out:
1) a cobalt/nickel compound is melted,
2) an aqueous solution of at least one surfactant is prepared,
3) the molten compound and the aqueous solution are mixed together under warm conditions and with stirring, so as to obtain an emulsion,
4) the emulsion is left to cool.

After the final step, the molten cobalt/nickel compound solidifies to give a suspension.

The compound used in the first step is a compound (i), (ii) and/or (iii) as defined previously.

Furthermore, the surfactant used in step 2) is more particularly chosen from anionic surfactants or a mixture of anionic and nonionic surfactants. Reference may be made, on this subject, to the two lists of surfactants given previously.

It should be noted that the stirring means used during the step for preparing the emulsion should be chosen as a function of the average size of the desired droplets., and then of the desired resulting solid particles. Generally, the means used are such that the size of the particles in the emulsion is less than 1 $\mu$m.

The suspension according to the invention is thus used in a lubricant drawing solution, as an additive allowing improved adhesion between the wire intended to be cabled and the rubber.

It is similarly used as an additive for improving the lubrication during the drawing operation.

Another subject of the present invention consists of a lubricant drawing solution comprising a suspension of the cobalt/nickel compound according to the invention.

Conventionally, the lubricant solutions used during the drawing operation comprise fatty acids, phosphate esters, amines, agents for preventing the corrosion of copper, and oils (mineral oils or plant oils).

It should be noted that the general term "solution" is intended to denote not only solutions but also suspensions.

These compounds represent about 20 to 90% by weight of the lubricant solution, the remainder being water.

The lubricant solutions are then diluted to 5–15% before being used in the drawing operations.

Generally, the pH of the lubricant solutions is between 7.4 and 9, preferably between 7.6 and 8.6.

The solution of cobalt/nickel compound according to the invention is thus added to the lubricant solution.

This can be carried out in various ways. The first consists in adding the cobalt/nickel compound suspension according to the invention to the lubricant solution, which has or has not been prediluted. The second consists in adding the cobalt/nickel compound suspension according to the invention at the time of dilution of the lubricant solution, for example with the dilution water.

More particularly, the cobalt/nickel compound suspension according to the invention is used in contents such that the amount of cobalt/nickel (expressed as cobalt/nickel metal) relative to the drawing solution is between 50 and 5000 ppm.

The wet drawing operations are carried out in a manner known in the field. In summary, the brass-plated steel wire is passed through several died, immersed in the lubricant solution comprising the cobalt/nickel compound suspension according to the invention, in order to reduce the diameter of the wire by 2 to 20% per die.

The drawing is conventionally carried out at temperatures of between 25 and 60° C.

Concrete but in no way limiting examples of the invention will now be given.

EXAMPLE 1

1/ Preparation of a Cobalt Oleate Suspension
Solution A 31 ml of an aqueous solution comprising 50 g/l of sodium oleate are prepared.

5 ml of an aqueous Igepal NP14 solution at a concentration of 32 g/l are then mixed with this solution, with stirring.

4 ml of water are then added.

60 ml of an aqueous solution comprising 0.5 g/l of cobalt acetate are then prepared and introduced into solution A obtained above.

A stable cobalt oleate suspension is thus obtained and the median diameter of the particles is 0.08 $\mu$m (the size distribution is determined by laser scattering granulometry using a Horiba LA-910 machine). 2/ Use of the suspension in a drawing operation A lubricant dispersion is prepared comprising Supersol ADM (lubricant solution sold by Rhodia Chimie) and the cobalt oleate suspension obtained in point 1/, in the following way:

A mixture of 5 g of Supersol ADM and 5 g of the cobalt oleate suspension according to the invention is prepared and the mixture is stirred at 800 rpm for 10 minutes.

90 g of the cobalt oleate suspension according to the invention are then added, with stirring.

The content of the cobalt metal in the lubricant dispersion thus obtained is 1400 ppm.

The dilute lubricant dispersion thus obtained is stable.

The median size of the particles in the lubricant dispersion is 0.23 μm (the size distribution is determined by laser scattering granulometry using a Horiba LA-910 machine).

It should be noted that the particle size is identical to that for particles which would have been obtained by diluting the same amount of Supersol ADM in pure water.

The particles of the cobalt oleate suspension according to the invention are no longer detected in the lubricant dispersion obtained. Specifically, the granulometer gives a volume distribution and is consequently only sensitive to the coarsest particles.

This therefore implies that the cobalt oleate suspension is stable and does not decant when it is placed in contact with the lubricant dispersion.

A Falex wear test is carried out on a bar of brass inserted in tungsten carbide jaws, immersed in the lubricant dispersion comprising the cobalt oleate obtained above.

The principle of the test is to measure the loss of mass of the brass bar driven in rotation at 330 rpm under a pressure of about 567 kg (i.e. 1250 lbs) exerted by the jaws for 10 minutes.

ESCA analysis of the bar thus treated shows that there is cobalt at the surface.

EXAMPLE 2

A lubricant dispersion is prepared comprising Supersol ADM (lubricant solution sold by Rhodia Chimie) and the cobalt oleate suspension obtained in point 1/of Example 1, as follows:

A mixture of 5 g of Supersol ADM and 5 g of the cobalt oleate suspension according to the invention is prepared and the mixture is stirred at 800 rpm for 10 minutes.

12 g of the cobalt oleate suspension according to the invention and 80 g of water are then added, with stirring.

The content of cobalt metal in the lubricant dispersion thus obtained is 255 ppm.

The Falex wear test as described in Example 1 is carried out with, on the one hand, a cobalt-free lubricant dispersion, and, on the other hand, a lubricant dispersion comprising 255 ppm of cobalt.

The evaluation of the loss of mass of the bar is carried out by weighing the bar before and after the wear experiment.

The results are as follows:

|  | Dispersion without cobalt | Dispersion with cobalt |
| --- | --- | --- |
| Loss of mass (mg) | 12.0 | 3.0 |

EXAMPLE 3

1000 kg of a lubricant dispersion are prepared in the same manner as that described in Example 1.

The cobalt content of the dispersion is 255 ppm and the dispersion also comprises 8% of Supersol ADM.

A drawing operation is carried out on a brass-plated high-strength steel wire (initial diameter 1.3 mm, final diameter 0.175 mm).

The drawing rate is 900 m/minute.

The results are as follows:

During the first hour of the drawing, an immediate wear of the dies used is observed with the cobalt-free lubricant dispersion. This wear led, after one hour, to the dies being changed since the diameter of the drawn wire was outside the desired specifications.

On the other hand, during this same period, no wear justifying a change of the dies was observed when the lubricant dispersion according to the invention was used.

Furthermore, after drawing 750 kg of wire at a rate of 900 m/minute, the use of the lubricant dispersion according to the invention made it possible to reduce the total consumption of dies by 40%.

Finally, the ESCA analysis of the cabled mesh (cabled steel cord) shows that cobalt is present at the surface.

Furthermore, an improvement in the adhesion of the cabled mesh to tyre rubber was observed, as was an improvement in the resistance of the adhesion to ageing.

EXAMPLE 4

1/ Preparation of the Cobalt Phosphate Ester Suspension

A solution is prepared comprising 20 ml of an aqueous solution comprising 5 g/l of Rhodafac PA 35 phosphate ester (neutralized with 0.1 N NaOH at a pH=8) and 5 ml of Rhodasurf T80 (1 g/l).

Rhodafac PA35 phosphate ester is an ethoxylated (50 EO) $C_{16}$–$C_{18}$ alcohol sold by Rhodia Chimie.

The surfactant Alkamuls T80 is an ethoxylated (20 EO) sorbitan monooleate sold by Rhodia Chimie.

60 ml of an aqueous solution comprising 1.75 g/l of cobalt acetate are then prepared and are introduced into the solution obtained above.

A stable cobalt phosphate ester suspension is thus obtained. The median particle diameter is about 0.15 μm.

2/ Use of the Suspension in a Drawing Operation

The process is performed as described in Example 1.

The ESCA analysis of the treated bar shows that there is cobalt at the surface.

What is claimed is:

1. A method for improving the adhesion or lubrication between brass plated steel wire and rubber, comprising preparing an aqueous suspension comprising at least one compound comprising a cobalt and/or nickel salt of a saturated or unsaturated carboxylic acid (i) or of a phosphate ester (ii) or of a cobalt and/or nickel boroacylate (iii); and at least one nonionic or anionic surfactant, in a lubricant drawing solution;

the weight ratio of compound (i), (ii) and/or (iii) to the surfactant being between 0.5 and 10; and, treating a brass-plated steel wire with the solution.

2. The method according to claim 1, wherein the aqueous suspension comprises at least one cobalt and/or nickel salt of a saturated or unsaturated acid (i), comprising 5 to 40 carbon atoms.

3. The method according to claim 2, wherein the aqueous suspension of a cobalt and/or nickel salt is derived from an acid of the following formula:

in which formula $R^1$ represents a linear or branched alkyl or alkenyl radical with one or more ethylenic unsaturations, containing from 5 to 40 carbon atoms (the carbon atom of the carboxylic group being included), optionally substituted with one or more hydroxyl radicals and/or a carboxylic function.

4. The method according to claim 3, wherein $R^1$ in the acid of the formula $R^1$—COOH represents an alkyl radical comprising 7 to 30 carbon atoms (the carbon atom of the carboxylic group being included), optionally substituted with one or more hydroxyl radicals and/or a carboxylic function.

5. The method according to claim 1, wherein the aqueous suspension of a cobalt and/or nickel salt of a phosphate ester (ii) is derived from a phosphate ester of the following formula:

$$[R^2(OX)_n]_p\text{—}P(\!=\!O)(OM)_{p'}.$$

$R^2$ is a saturated or unsaturated, aliphatic, cycloaliphatic or aromatic hydrocarbon-based radical containing 1 to 30 carbon atoms, X is a linear or branched alkylene radical comprising 2 to 4 carbon atoms, n is a value ranging from 0 to 100, p and p' are equal to 1 or 2, with the condition that p+p'=3.

6. The method according to claim 1, wherein the nickel and/or cobalt boroacylate has the following formula:

$$B(O\text{—}Co\text{—}A)_m(O\text{—}Ni\text{—}A)_{3-m}$$

in which formula:

A, which may be identical or different, represent a saturated or unsaturated monocarboxylic acid residue comprising 7 to 24 carbon atoms; a resinic acid residue; an aromatic acid residue comprising 7 to 11 carbon atoms; a naphthenic acid residue, m is an integer or non-integer between 0 and 3, inclusive.

7. The method according to claim 1, wherein the surfactant is selected from the following compounds:

Nonionic:
  polyoxyalkylenated alkylphenols in which the alkyl substituent is $C_6$–$C_{12}$;
  polyoxyalkylenated mono-, di- or tri(alkylaryl)phenols in which the alkyl substituent is $C_1$–$C_6$;
  polyoxyalkylenated $C_8$–$C_{22}$ aliphatic alcohols;
  polyoxyalkylenated triglycerides;
  polyoxyalkylenated fatty acids;
  polyoxyalkylenated sorbitan esters;
  polyoxyalkylenated fatty amines;
  polyoxyalkylenated $C_8$–$C_{20}$ fatty acid amides;
  glucosamides, glucamides;
  alkylpolyglycosides;
  glycerolamides derived from N-alkylamines;
  the products resulting from the condensation of ethylene oxide with a hydrophobic compound resulting from the condensation of propylene oxide with propylene glycol;
  the products resulting from the condensation of ethylene oxide with a compound resulting from the condensation of propylene oxide with ethylenediamine;
  the products resulting from the condensation of ethylene oxide with a hydrophobic compound resulting from the condensation of propylene oxide with an alcohol of terpenic origin;
  amine oxides;

Anionic:
  alkyl ester sulphonates of formula R—CH($SO_3M$)—COOR', in which R represents a $C_8$–$C_{20}$ alkyl radical, R' represents a $C_1$–$C_6$ alkyl radical and M represents an alkali metal cation, ammonium —$N(R_3)^+$ with R, which may be identical or different, representing a hydrogen atom, a hydrocarbon-based radical comprising 1 to 4 carbon atoms, optionally bearing a hydroxyl radical;
  alkyl sulphates or alkyl aryl sulphates of formula $ROSO_3M$, in which R represents a $C_{10}$–$C_{24}$ alkyl or hydroxyalkyl radical, M representing a hydrogen atom or a cation of the same definition as above, as well as the ethoxylated (EO) and/or propoxylated (PO) derivatives thereof;
  sulphated polyoxyalkylenated fatty alcohols; sulphated polyoxyalkylenated di(1-phenylethyl)phenols; sulphated polyoxyalkylenated tri(1-phenylethyl) phenols; sulphated polyoxyalkylenated alkylphenols;
  alkylamide sulphates of formula RCONHR'OSO$_3$M in which R represents a $C_2$–$C_{22}$ alkyl radical, R' represents a $C_2$–$C_3$ alkyl radical, M representing a hydrogen atom or a cation of the same definition as above, as well as the ethoxylated (EO) and/or propoxylated (PO) derivatives thereof;
  salts of saturated or unsaturated $C_8$–$C_{24}$ fatty acids, $C_9$–$C_{20}$ alkylbenzenesulphonates, primary or secondary $C_8$–$C_{22}$ alkyl sulphonates, alkylglycerol sulphonates, sulphonated polycarboxylic acids and paraffin sulphonates;
  polyoxyalkylenated fatty alkyl mono- or diester phosphates, polyoxyalkylenated di(1-phenylethyl) phenyl mono- or diester phosphates, polyoxyalkylenated tri(1-phenylethyl)phenyl mono- or diester phosphates, polyoxyalkylenated alkylphenyl mono- or diester phosphates;
  N-acyl N-alkyltaurates, alkyl isethionates, alkyl succinamates, alkyl sulphosuccinates, sulphosuccinate monoesters or diesters, N-acyl sarcobinates, alkyl glycoside sulphates, polyethoxycarboxylates, the cation being an alkali metal, an ammonium —$N(R_3)^+$ with R, which may be identical or different, representing a hydrogen atom, a hydrocarbon-based radical comprising 1 to 4 carbon atoms, optionally bearing a hydroxyl radical; or mixtures thereof.

8. The method according to claim 1, wherein the weight ratio of compound (i), (ii) and/or (iii) to the surfactant is between 1 and 5 inclusive.

9. Aqueous suspension consisting essentially of at least one compound of a cobalt and/or nickel salt of a saturated or unsaturated carboxylic acid (i); and at least one nonionic or anionic surfactant; the weight ratio of compound (i) to the surfactant being between about 0.5 and 10.

10. Suspension according to claim 9, wherein the cobalt and/or nickel salt of a carboxylic acid is derived from an acid of the following formula:

$$R^1\text{—COOH}$$

in which formula $R^1$ represents a linear or branched alkyl or alkenyl radical with one or more ethylenic unsaturations, containing from 5 to 40 carbon atoms (the carbon atom of the carboxylic group being included), optionally substituted with one or more hydroxyl radicals and/or a carboxylic function.

11. Suspension according to claim 9, wherein the acid comprises only one carboxylic function.

12. Suspension according to claim 9, wherein the acid is selected from the group consisting of palmitic acid, behenic acid, stearic acid, palmitoleic acid, oleic acid, petroselenic acid, erucic acid, linoleic acid, linolenic acid and ricinoleic acid.

13. Suspension according to claim 9, wherein the surfactant is selected from the following compounds:

Nonionic:
polyoxyalkylenated alkylphenols in which the alkyl substituent is $C_6$–$C_{12}$;
polyoxyalkylenated mono-, di- or tri(alkylaryl)phenols in which the alkyl substituent is $C_1$–$C_6$;
polyoxyalkylenated $C_8$–$C_{22}$ aliphatic alcohols;
polyoxyalkylenated triglycerides;
polyoxyalkylenated fatty acids;
polyoxyalkylenated sorbitan esters;
polyoxyalkylenated fatty amines;
polyoxyalkylenated $C_8$–$C_{20}$ fatty acid amides;
glucosamides, glucamides;
alkylpolyglycosides;
glycerolamides derived from N-alkylamines;
the products resulting from the condensation of ethylene oxide with a hydrophobic compound resulting from the condensation of propylene oxide with propylene glycol;
the products resulting from the condensation of ethylene oxide with a compound resulting from the condensation of propylene oxide with ethylenediamine;
the products resulting from the condensation of ethylene oxide with a hydrophobic compound resulting from the condensation of propylene oxide with an alcohol of terpenic origin;
amine oxides;

Anionic:
alkyl ester sulphonates of formula R—CH($SO_3M$)—COOR', in which R represents a $C_8$–$C_{20}$ alkyl radical, R' represents a $C_1$–$C_6$ alkyl radical and M represents an alkali metal cation, ammonium —$N(R_3)^+$ with R, which may be identical or different, representing a hydrogen atom, a hydrocarbon-based radical comprising 1 to 4 carbon atoms, optionally bearing a hydroxyl radical;
alkyl sulphates or alkyl aryl sulphates of formula $ROSO_3M$, in which R represents a $C_{10}$–$C_{24}$ alkyl or hydroxyalkyl radical, M representing a hydrogen atom or a cation of the same definition as above, as well as the ethoxylenated (EO) and/or propoxylenated (PO) derivatives thereof;
sulphated polyoxyalkylenated fatty alcohols; sulphated polyoxyalkylenated di(1-phenylethyl)phenols; sulphated polyoxyalkylenated tri(1-phenylethyl) phenols; sulphated polyoxyalkylenated alkylphenols;
alkylamide sulphates of formula $RCONHR'OSO_3M$ in which R represents a $C_2$–$C_{22}$ alkyl radical, R' represents a $C_2$–$C_3$ alkyl radical, M representing a hydrogen atom or a cation of the same definition as above, as well as the ethoxylenated (EO) and/or propoxylenated (PO) derivatives thereof;
salts of saturated or unsaturated $C_8$–$C_{24}$ fatty acids, $C_9$–$C_{20}$ alkylbenzenesulphonates, primary or secondary $C_8$–$C_{22}$ alkyl sulphonates, alkylglycerol sulphonates, sulphonated polycarboxylic acids and paraffin sulphonates;
polyoxyalkylenated fatty alkyl mono- or diester phosphates, polyoxyalkylenated di(1-phenylethyl) phenyl mono- or diester phosphates, polyoxyalkylenated tri(1-phenylethyl)phenyl mono- or diester phosphates, polyoxyalkylenated alkylphenyl mono- or diester phosphates;
N-acyl N-alkyltaurates, alkyl isethionates, alkyl succinamates, alkyl sulphosuccinates, sulphosuccinate monoesters or diesters, N-acyl sarcobinates, alkyl glycoside sulphates, polyethoxycarboxylates, the cation being an alkali metal, an ammonium —$N(R_3)^+$ with R, which may be identical or different, representing a hydrogen atom, a hydrocarbon-based radical comprising 1 to 4 carbon atoms, optionally bearing a hydroxyl radical; or mixtures thereof.

14. Suspension according to claim 9, wherein the weight ratio of compound (i) to the surfactant is between 1 and 5.

15. Process for preparing a suspension according to claim 9, wherein a water-soluble derivative of a carboxylic acid (i) is placed in contact, in aqueous medium, with a cobalt and/or nickel salt, in the presence of at least one surfactant.

16. Process for preparing a suspension according to claim 9, wherein the following steps are carried out:
1) melting a cobalt/nickel compound,
2) preparing an aqueous solution of at least one surfactant,
3) mixing the compound and the aqueous solution together under warm conditions and with stirring, so as to obtain an emulsion,
4) cooking the emulsion.

17. Lubricant drawing solution comprising the suspension according to claim 9.

18. Lubricant drawing solution according to claim 17, wherein the amount of cobalt and/or nickel (expressed as metal) relative to the lubricant drawing solution is between 50 and 5000 ppm.

19. Suspension according to claim 9, wherein the suspension provides improved adhesion between brass-plated steel wire treated with the suspension and rubber.

20. Aqueous suspension comprising at least one compound of a cobalt and/or nickel salt of a phosphate ester (ii), or of a cobalt and/or nickel boroacylate (iii); and at least one nonionic or anionic surfactant; the weight ratio of compound (ii) and/or (iii) to the surfactant being between about 0.5 and 10.

21. Suspension according to claim 20, wherein the cobalt and/or nickel salt of a phosphate ester (ii) is derived from a phosphate ester of the following formula:

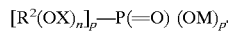

$[R^2(OX)_n]_p$—P(=O) (OM)$_{p'}$ $R^2$ is a saturated or unsaturated, aliphatic, cycloaliphatic or aromatic hydrocarbon-based radical containing 1 to 30 carbon atoms, X is a linear or branched alkylene radical comprising 2 to 4 carbon atoms, M is a hydrogen atom, an alkali metal or an ammonium radical of formula —$N(R_3)^+$, in which R, which may be identical or different, represent a hydrogen atom, a $C_1$–$C_4$ alkyl radical, optionally comprising an oxygen atom, n is a value ranging from 0 to 100, p and p' are equal to 1 or 2, with the condition that p+p'=3.

22. Suspension according to claim 20, wherein the cobalt and/or nickel boroacylate has the following formula:

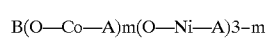

B(O—Co—A)m(O—Ni—A)3-m in which formula;

A, which may be identical or different, represent a saturated or unsaturated monocarboxylic acid residue comprising 7 to 24 carbon atoms; a resinic acid residue; an aromatic acid residue comprising 7 to 11 carbon atoms; a naphthenic acid residue, m is an integer or non-integer between 0 and 3, inclusive.

23. Suspension according to claim 20, wherein the surfactant is selected from the following compounds:

Nonionic:
- polyoxyalkylenated alkylphenols in which the alkyl substituent is $C_6$–$C_{12}$;
- polyoxyalkylenated mono-, di- or tri(alkylaryl)phenols in which the alkyl substituent is $C_1$–$C_6$;
- polyoxyalkylenated $C_8$–$C_{22}$ aliphatic alcohols;
- polyoxyalkylenated triglycerides;
- polyoxyalkylenated fatty acids;
- polyoxyalkylenated sorbitan esters;
- polyoxyalkylenated fatty amines;
- polyoxyalkylenated $C_8$–$C_{20}$ fatty acid amides;
- glucosamides, glucamides;
- alkylpolyglycosides;
- glycerolamides derived from N-alkylamines;
- the products resulting from the condensation of ethylene oxide with a hydrophobic compound resulting from the condensation of propylene oxide with propylene glycol;
- the products resulting from the condensation of ethylene oxide with a compound resulting from the condensation of propylene oxide with ethylenediamine;
- the products resulting from the condensation of ethylene oxide with a hydrophobic compound resulting from the condensation of propylene oxide with an alcohol of terpenic origin;
- amine oxides;

Anionic:
- alkyl ester sulphonates of formula R—CH($SO_3M$)—COOR', in which R represents a $C_8$–$C_{20}$ alkyl radical, R' represents a $C_1$–$C_6$ alkyl radical and M represents an alkali metal cation, ammonium —$N(R_3)^+$ with R, which may be identical or different, representing a hydrogen atom, a hydrocarbon-based radical comprising 1 to 4 carbon atoms, optionally bearing a hydroxyl radical;
- alkyl sulphates or alkyl aryl sulphates of formula $ROSO_3M$, in which R represents a $C_{10}$–$C_{24}$ alkyl or hydroxyalkyl radical, M representing a hydrogen atom or a cation of the same definition as above, as well as the ethoxylated (EO) and/or propoxylated (PO) derivatives thereof;
- sulphated polyoxyalkylenated fatty alcohols; sulphated polyoxyalkylenated di(1-phenylethyl)phenols; sulphated polyoxyalkylenated tri(1-phenylethyl)phenols; sulphated polyoxyalkylenated alkylphenols;
- alkylamide sulphates of formula RCONHR'$OSO_3M$ in which R represents a $C_2$–$C_{22}$ alkyl radical, R' represents a $C_2$–$C_3$ alkyl radical, M representing a hydrogen atom or a cation of the same definition as above, as well as the ethoxylated (EO) and/or propoxylated (PO) derivatives thereof;
- salts of saturated or unsaturated $C_8$–$C_{24}$ fatty acids, $C_9$–$C_{20}$ alkylbenzenesulphonates, primary or secondary $C_8$–$C_{22}$ alkyl sulphonates, alkylglycerol sulphonates, sulphonated polycarboxylic acids and paraffin sulphonates;
- polyoxyalkylenated fatty alkyl mono- or diester phosphates, polyoxyalkylenated di(1-phenylethyl) phenyl mono- or diester phosphates, polyoxyalkylenated tri(1-phenylethyl)phenyl mono- or diester phosphates, polyoxyalkylenated alkylphenyl mono- or diester phosphates;
- N-acyl N-alkyltaurates, alkyl isethionates, alkyl succinamates, alkyl sulphosuccinates, sulphosuccinate monoesters or diesters, N-acyl sarcobinates, alkyl glycoside sulphates, polyethoxycarboxylates, the cation being an alkali metal, an ammonium —$N(R_3)^+$ with R, which may be identical or different, representing a hydrogen atom, a hydrocarbon-based radical comprising 1 to 4 carbon atoms, optionally bearing a hydroxyl radical; or
- mixtures thereof.

24. Suspension according to claim 20, wherein the weight ratio of compound (ii) and/or (iii) to the surfactant is between 1 and 5.

25. Process for preparing a suspension according to claim 20, wherein a water-soluble derivative of a phosphate ester (ii) is placed in contact, in aqueous medium, with a cobalt and/or nickel salt, in the presence of at least one surfactant.

26. Process for preparing a suspension according to claim 20, wherein the following steps are carried out:
1) melting a cobalt/nickel compound,
2) preparing an aqueous solution of at least one surfactant,
3) mixing the compound and the aqueous solution together under warm conditions and with stirring, so as to obtain an emulsion,
4) cooking the emulsion.

27. Lubricant drawing solution comprising the suspension according to claim 21.

28. Lubricant drawing solution according to claim 27, wherein the amount of cobalt and/or nickel (expressed as metal) relative to the lubricant drawing solution is between 50 and 5000 ppm.

* * * * *